United States Patent [19]
Booth et al.

[11] Patent Number: 5,671,769
[45] Date of Patent: Sep. 30, 1997

[54] SWING CHECK VALVE AND METHOD FOR REPAIRING SAME

[75] Inventors: Walter Booth, East Hanover; Alan R. Levin, Somerville, both of N.J.

[73] Assignee: H-Tech, Inc., Wilmington, Del.

[21] Appl. No.: 548,977

[22] Filed: Oct. 27, 1995

[51] Int. Cl.⁶ .................................................. F16K 15/03
[52] U.S. Cl. .......................... 137/15; 137/240; 137/269.5; 137/271; 137/527.4; 137/527.8
[58] Field of Search .......................... 137/240, 269.5, 137/271, 527, 527.4, 527.8, 15; 251/85

[56] References Cited

U.S. PATENT DOCUMENTS

| | | | |
|---|---|---|---|
| Re. 21,334 | 1/1940 | White et al. | 137/515.7 |
| 294,960 | 3/1884 | Blessing | 137/527.2 |
| 991,784 | 5/1911 | Kiley | 137/527.4 |
| 1,233,856 | 7/1917 | Elder | 137/240 X |
| 1,756,225 | 4/1930 | Thurstensen | 137/269.5 |
| 2,001,271 | 5/1935 | Smith | 137/240 X |
| 2,017,033 | 10/1935 | McGuffin | 137/527.4 X |
| 2,265,595 | 12/1941 | Carlson | 137/527.4 |
| 2,312,290 | 11/1943 | Smith et al. | 137/527.4 |
| 2,589,176 | 3/1952 | Wheatley | 137/269.5 |
| 2,717,001 | 9/1955 | Perrault | 137/527.4 X |
| 2,756,017 | 7/1956 | Silverman | 137/527.8 X |
| 3,275,028 | 9/1966 | Reppert et al. | 137/527.8 X |
| 3,378,021 | 4/1968 | Milo | 137/527.4 X |
| 3,613,720 | 10/1971 | Welch | 137/527.8 |
| 4,062,378 | 12/1977 | Bender | 137/269.5 X |
| 4,120,318 | 10/1978 | Jourdan | 137/527.4 |
| 4,296,772 | 10/1981 | Nilsson | 137/269.5 |
| 4,809,738 | 3/1989 | Scarmaucci | 137/527.8 X |

*Primary Examiner*—John Rivell
*Attorney, Agent, or Firm*—Selitto & Associates

[57] ABSTRACT

A swing check valve, which is adapted for automatically inhibiting back flow of fluid from an outlet thereof to an inlet thereof, includes a clapper member and a housing. The housing has a first body portion, which includes its own valve seat and its own mounting mechanism adapted to removably mount the clapper member therefrom when the first body portion is positioned adjacent to the inlet of the valve. The housing also has a second body portion, which includes its own valve seat and its own mounting mechanism adapted to removably mount the clapper member therefrom when the second body portion is positioned adjacent to the inlet of the valve. The first and second body portions are removably connected to each other in an end-to-end fashion and are interchangeable with each other, whereby each body portion may be utilized as a replacement for the other body portion.

23 Claims, 3 Drawing Sheets

SWING CHECK VALVE AND METHOD FOR REPAIRING SAME

FIELD OF THE INVENTION

The present invention relates to valves and methods for repairing same, and, more particularly, to clapper-type swing check valves adapted for automatically inhibiting back flow of fluid therethrough and methods for repairing such valves.

BACKGROUND OF THE INVENTION

Over the years, clapper-type swing check valves have been used in various piping systems, such as sewer systems. Such a valve typically includes a housing and a clapper pivotally mounted within the housing. More particularly, the housing is equipped with a valve seat positioned so as to be engageable by the clapper, while the clapper includes an arm, which is pivotally mounted on the housing, and a valve member mounted on the arm for conjoint pivoting movement with the arm. The clapper pivots freely between its closed position, in which the valve member is received on the valve seat, and its open position, in which the valve member is disengaged from the valve seat, in response to flow of fluid from an inlet of the valve and to an outlet of the valve.

There are numerous disadvantages, both from the standpoint of efficiency and cost-effectiveness, which are typically associated with swing check valves of the type described above. For instance, during the operation of such valves, the valve seat is subjected to stress resulting from its repeated engagement by the valve member and is thereby prone to wear and/or damage. When the valve seat becomes worn and/or damaged, the housing is typically replaced with a new one. Thus, in the event that a spare housing is not readily available (i.e., in stock), the valve is generally left inoperable until a new housing is actually obtained, thereby increasing the downtime required for repair and/or replacement operations.

In the past, efforts have been made to improve the design of the clapper-type swing check valves discussed above. For instance, U.S. Pat. No. 4,296,722 discloses a swing check valve equipped with a symmetrical housing having a pair of identical valve seats and a pair of identical bearing mechanisms, each of which is adapted to pivotally mount a reversible valve flap. Because the housing has a unitary construction, each of the valve seats is not individually replaceable. As a result, the valve still suffers from the disadvantages discussed in the preceding paragraphs.

U.S. Pat. No. 2,756,017 relates to a flapper valve equipped with a pair of clappers mounted within a housing assembly. More particularly, the housing assembly includes a pair of opposing end plates clamped between a pair of clamping plates against an elongated cylindrical body section by bolts. Valve seats are formed in the end plates for engagement by a corresponding one of the clappers, each of which is mounted on a corresponding one of the end plates. Because both valve seats are in use simultaneously, one of the valve seats cannot be used to replace the other valve seat in the event that the other valve seat becomes damaged and/or worn. Further, because the housing assembly is formed from numerous components, it is not adapted for providing easy access to the valve seats. As a result, valve seat repair and/or replacement is rendered inefficient.

SUMMARY OF THE INVENTION

The present invention overcomes the disadvantages and shortcomings of the prior art discussed above by providing a new and improved swing check valve adapted for efficient and cost-effective repair. More particularly, the swing check valve includes a housing made from a pair of identical body sections, each of which has a valve seat and a mounting assembly adapted to mount a clapper member therefrom. The body sections are removably connected to each other in an end-to-end fashion and are interchangeable with each other. In this manner, each body section may be utilized as a replacement for the other body section, if and when it or its associated valve seat becomes damaged and/or worn.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE EXEMPLARY EMBODIMENT

Figure 1:
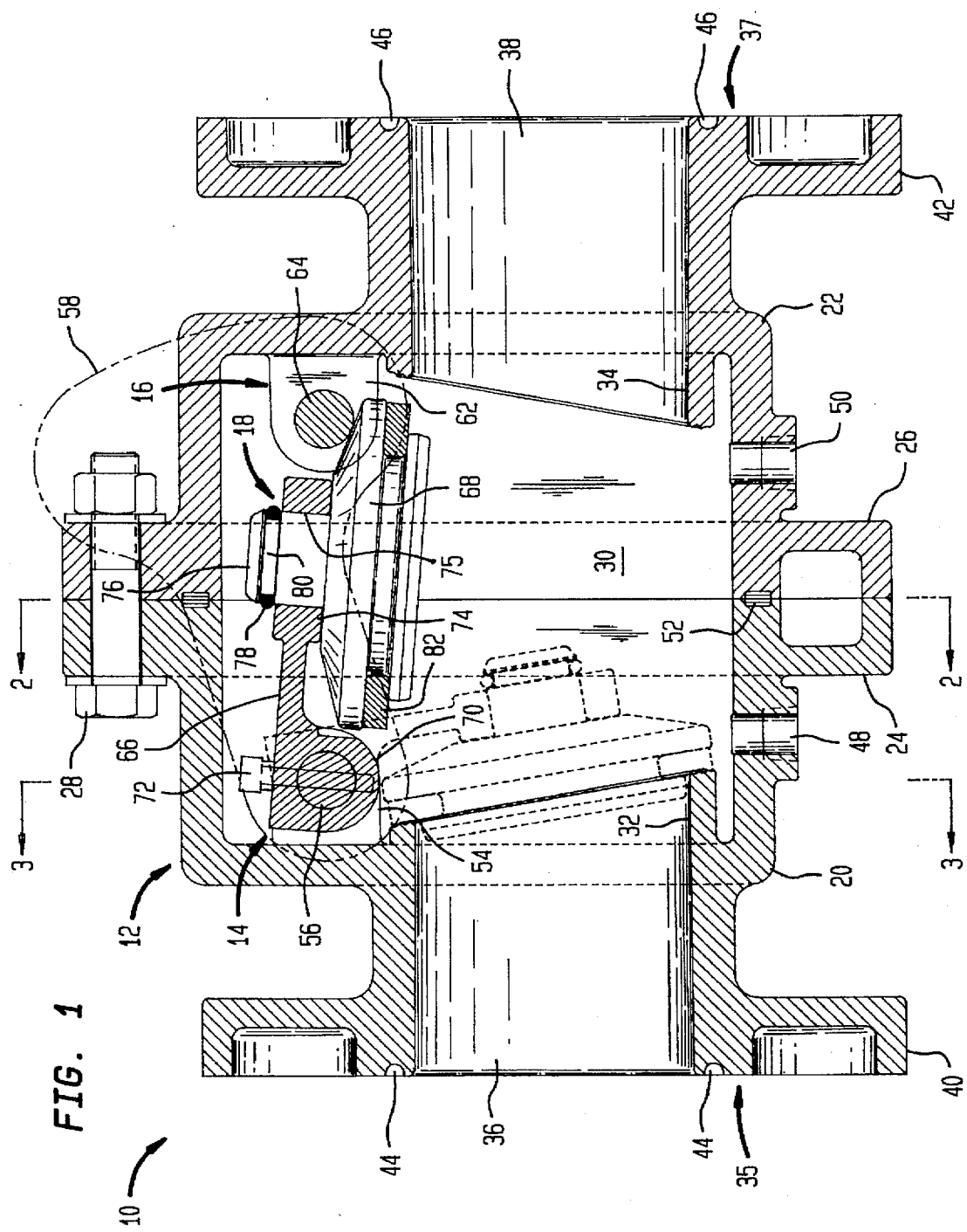
FIG. 1 is a cross-sectional view of a swing check valve constructed in accordance with the present invention, the open position of the valve being shown by a solid line representation of the valve's clapper, and the closed position of the valve being shown by a broken line representation of the clapper.

With reference to FIG. 1, a swing check valve 10 constructed in accordance with the present invention includes a housing 12, pintle assemblies 14, 16, which are mounted on and within the housing 12, and a clapper 18, which is mounted within the housing 12. More particularly, the housing 12 is defined by a pair of identical and interchangeable body portions 20, 22 having mounting flanges 24, 26, respectively, for removably attaching the body portions 20, 22 to each other in an end-to-end fashion by any conventional mechanism, such as bolts 28 (only one of which is shown in FIG. 1), so as to form an internal valve chamber 30. The body portions 20, 22 also include inclined valve seats 32, 34, respectively, positioned at opposed ends of the chamber 30. Further, the body portions 20, 22 are provided with channels 36, 38, respectively, communicating with the chamber 30 and extending from the valve seats 32, 34, respectively, to free ends 35, 37, respectively, of the body portions 20, 22, respectively. The free ends 35, 37 of the body portions 20, 22, respectively, include flanges 40, 42, respectively, for connection with mating flanges of an associated piping system (not shown), such as a storm sewer system, by any conventional mechanism so as to removably mount the valve 10 in such a system. Oval grooves 44, 46, each of which is sized and shaped so as to receive a corresponding O-ring or flat gasket (not shown), are provided in the flanges 40, 42, respectively, for providing a fluid-tight seal between the flanges 40, 42 and the mating flanges (not shown) of the piping system. Further, the body portions 20, 22 include a pair of flush ports 48, 50, respectively, each of which is plugged in a fluid-tight manner by a conventional mechanism (not shown), such as a threaded plug, during the operation of the valve 10, but which can be unplugged for purposes to be discussed hereinafter. The body portions 20, 22 are also provided with an O-ring sealing member 52 positioned between the flanges 24, 26 for providing a fluid-tight seal for the chamber 30.

Figure 3:
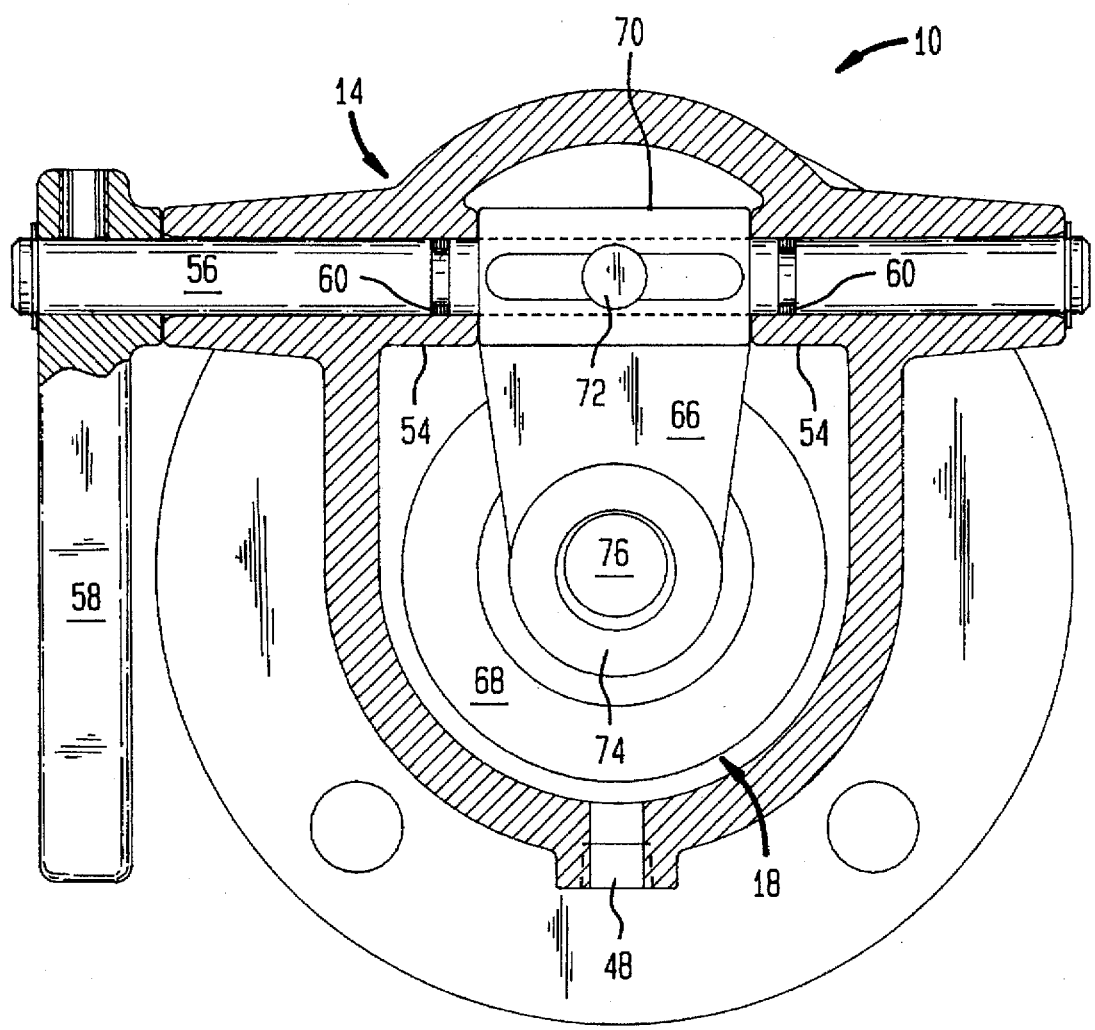
FIG. 3 is a cross-sectional view, taken along section line 3—3 and looking in the direction of the arrows, of the valve illustrated in FIG. 1, except that the valve is shown in its closed position rather than its open position.

Referring primarily to FIGS. 1 and 3, the pintle assembly 14 includes bearing bushings 54 which are formed on the body portion 20 above the valve seat 32 and which are spaced apart to form a space therebetween for purposes to be discussed hereinafter. The pintle assembly 14 also includes a shaft 56, which is rotatably mounted in the bearing bushings 54, and an external lever 58, which is removably attached to the shaft 56 for purposes to be discussed hereinafter. The shaft 56 is provided with a pair of O-ring sealing members 60 mounted thereon, each of the sealing members 60 being positioned in a corresponding one of the bearing bushings 54 so as to seal the chamber 30.

With reference to FIG. 1, the pintle assembly 16 is provided with bearing bushings 62 (only one being shown in FIG. 1), which are formed on the body portion 22 above the valve seat 34 and which are spaced apart to form a space (not shown) therebetween. The pintle assembly 16 also includes a shaft 64, which is removably mounted in the bearing bushings 62 for purposes to be discussed hereinafter. The shaft 64 is provided with a pair of O-ring sealing members (not shown) mounted thereon, each of the sealing members being positioned in a corresponding one of the bearing bushings 62 so as to seal the chamber 30.

Figure 2:
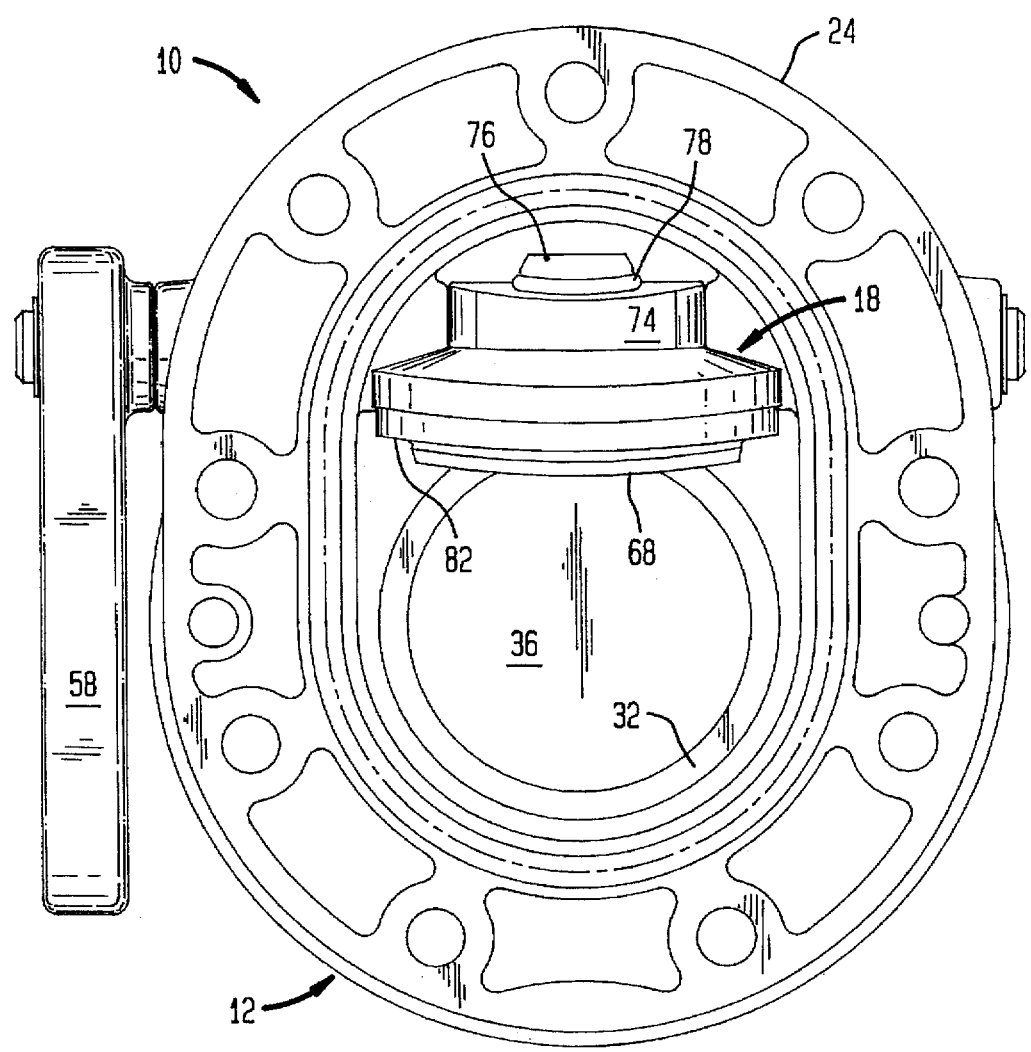
FIG. 2 is a cross-sectional view, taken along section line 2—2 and looking in the direction of the arrows, of the valve illustrated in FIG. 1.

Referring to FIGS. 1–3, the clapper 18 includes an arm 66 and a valve member 68 removably mounted on the arm 66. More particularly, the arm 66 includes a pivoting end 70, which is sized and shaped so as to be received in the space formed between the bearing bushings 54 and through which the shaft 56 extends. A retaining pin 72 is screwed into the shaft 56 through the pivoting end 70 such that the arm 66 is conjointly rotatable with the shaft 56 and the lever 58 and vice versa. The arm 66 also includes a mounting end 74 provided with an opening 75.

Referring still to FIGS. 1–3, the valve member 68 includes a stem 76, which projects from a rear face of the valve member 68, for loosely mounting the valve member 68 on the arm 66. More particularly, the stem 76 extends through the opening 75 of the mounting end 74 of the arm 66. An O-ring retainer 78 is mounted in a groove 80 formed on the stem 76 for retaining the valve member 68 on the arm 66 and for additional purposes to be discussed hereinafter. The valve member 68 is also provided with a sealing member 82 mounted on a front face of the valve member 68. Further, the valve member 68 is sized and shaped so as to be received on the valve seat 32 when the valve 10 is in its closed position.

In order to mount the valve 10 in a piping system, such as a storm sewer system, the valve 10 is assembled as described above and is connected to fluid conduits of the piping system such that the channel 36 is positioned downstream from the channel 38, whereby the channel 36 constitutes an inlet of the valve 10 and the channel 38 constitutes an outlet of the valve 10. In use, the clapper 18 pivots freely about a pivot axis extending through the shaft 56 between its closed position (indicated by a broken line representation of the clapper 18 in FIG. 1) and its fully open position (indicated by a solid line representation of the clapper 18 in FIG. 1) in response to flow of fluid through the valve 10 from the inlet to the outlet. More particularly, in its closed position, the valve member 68 sits on the valve seat 32. As fluid begins to flow from the inlet (i.e., the channel 36) to the outlet (i.e., the channel 38), the clapper 18 pivots upwardly until it reaches its fully opened position, in which position the valve member 68 abuts against the shaft 64 of the pintle assembly 16, whereby the clapper 18 is inhibited from coming in contact with the housing 12. As the flow of fluid from the inlet (i.e., the channel 36) to the outlet (the channel 38) is interrupted, the clapper 18 pivots downwardly toward its closed position until the valve member 68 is in full engagement with the valve seat 32. In this regard, the lever 58 functions as a counterweight and therefore biases the clapper 18 into its closed position.

When solid sediment becomes collected in the chamber 30 during the operation of the valve 10, at least one of the flush ports 48, 50 is opened by detaching its corresponding plug (not shown), thereby allowing any fluid remaining in the housing 12 to be drained out and thereby removing the sediment from the chamber 30. In order to enhance cleaning of the chamber 30, a pressurized fluid source, such as a water line, can be connected to one of the flush ports 48, 50, while the other one is left unplugged. Pressurized fluid is then injected into the chamber 30 through the one flush port, which functions as an inlet, and discharged through the other one, which functions as an outlet. As the pressurized fluid is flushed from the chamber 30, the remaining sediment is loosened by the turbulence created by the pressurized fluid. As a result, the sediment is flushed out of the chamber 30 along with the pressurized fluid.

When the valve seat 32 becomes worn and/or damaged, the body portion 20 is interchanged with the body portion 22. More particularly, after the body portions 20, 22 are disconnected from their associated fluid conduits, the body portions 20, 22 are detached from each other. The clapper 18 is then dismounted from the pintle assembly 14 of the body portion 20 and is mounted on the pintle assembly 16 of the body portion 22 in the same manner in which the clapper 18 is mounted on the pintle assembly 14. After the body portions 20, 22 are remounted to each other, the body portions 20, 22 are connected to their associated fluid conduits such that the channel 34 is positioned downstream from the channel 32.

It should be appreciated that the valve 10 provides numerous advantages over the prior art. For instance, because the body portions 20, 22 are identical and interchangeable and because the valve seat 34 of the body portion 22 is left unused during the operation of the valve 10, the body portion 22 functions as a spare which can be used for replacing the body portion 20 in the event that the valve seat 32 becomes worn and/or damaged. Further, as the clapper 18 moves between its closed and open positions, the O-ring retainer 78 functions as a spring, whereby the valve member 68 is rendered self-aligning as it is received on the valve seat 32 due to the adjustability provided by the O-ring retainer 78. In addition, because of the resiliency of the O-ring retainer 78, the O-ring retainer 78 functions as a cushion when the clapper 18 assumes its closed position or its open position. Moreover, because the shaft 64 inhibits the clapper 18 from striking the housing 12, the shaft 64 functions as a soft stop. In this way, wear and/or damage to the clapper 18 and/or the body portions 20, 22 are minimized, and noise resulting from the clapper 18 striking the housing 12 is reduced. This advantage becomes especially appreciable when the valve 10 is used in piping systems in which fluid velocity though the valve 10 is high and the clapper 18 thereby pivots between its open and closed positions at a high velocity.

It should be noted that because the body portions 20, 22 are connected to each other in an end-to-end fashion, the valve 10 is adapted for selective dismounting of one of the body portions 20, 22 from their associated piping system. For instance, in order to dismount the body portion 22 from the piping system, the bolts 28 are loosened and removed from the valve 10, thereby disconnecting the body portion 22 from the body portion 20. The flange 42 is then disconnected from its associated fluid conduit of the piping system to thereby dismount the body portion 22. The foregoing method of selectively dismounting one of the body portions 20, 22 can be utilized in performing various tasks. For instance, it can be used to visually inspect a part of the body portions 20, 22, such as the valve seats 32, 34 and/or the clapper 18, thereby eliminating the need to provide the valve 10 with a separate access port. It can also be used to selectively replace one of the body portions 20, 22 or to replace the clapper 18.

It will be understood that the embodiment described herein is merely exemplary and that a person skilled in the art may make many variations and modifications without departing from the spirit and scope of the invention. For instance, the pintle assemblies 14, 16 can be replaced by other conventional mechanisms for mounting the clapper 18 from the body portions 20, 22, respectively. The O-ring retainer 78 can also be replaced by conventional dynamic retaining devices, such as a spring, while the O-ring sealing members 52, 60 can be replaced by other conventional sealing mechanisms. In addition, the flanges 40, 42 can be replaced by other conventional mechanisms for mounting the valve 10 to its associated fluid conduits. Moreover, an annular insert may be provided between the flanges 24, 26 of the body portions 20, 22, respectively. All such variations and modifications are intended to be included within the scope of the invention as defined in the appended claims.

We claim:

1. A swing check valve adapted to inhibit back flow of fluid from an outlet thereof to an inlet thereof, comprising a clapper member; and a housing having a first body portion, which includes a first valve seat and first mounting means for removably mounting said clapper member therefrom when said first body portion is positioned adjacent to said inlet, and a second body portion, which includes a second valve seat and second mounting means for removably mounting said clapper member therefrom when said second body portion is positioned adjacent to said inlet, said first and second body portions being removably connected to each other in an end-to-end fashion and being identical to and interchangeable with each other, whereby each body portion may be utilized as a replacement for the other body portion.

2. The swing check valve of claim 1, further comprising attaching means for attaching said housing to an associated piping system.

3. The swing check valve of claim 2, wherein said first body portion further includes a first flange formed on one end thereof, and said second body portion further includes a second flange formed on one end thereof, said first and second flanges being removably attached to each other; and wherein said attaching means includes a third flange, which is formed on an opposite end of said first body portion, and a fourth flange, which is formed on an opposite end of said second body portion.

4. The swing check valve of claim 3, wherein said first body portion further includes first receiving means for receiving a sealing member so as to seal the connection between said first body portion and an associated piping system; and wherein said second body portion further includes second receiving means for receiving a sealing member so as to seal the connection between said second body portion and an associated piping system.

5. The swing check valve of claim 4, wherein said first receiving means includes a first groove formed in said opposite end of said first body portion; and wherein said second receiving means includes a second groove formed in said opposite end of said second body portion, each of said first and second grooves being sized and shaped so as to receive an O-ring or a flat gasket.

6. The swing check valve of claim 5, further comprising sealing means for sealing the connection between said first and second body portions.

7. The swing check valve of claim 1, further comprising draining means for draining fluid from an interior chamber of said housing.

8. The swing check valve of claim 7, wherein said draining means includes a first opening formed in said first body portion and communicating with said chamber and a second opening formed in said second body portion and communicating with said chamber.

9. The swing check valve of claim 8, wherein pressurized fluid is injected into said chamber through one of said openings and then discharged from said chamber through the other one of said openings.

10. The swing check valve of claim 1, wherein said first body portion and said second body portion are replaceable independently of each other, whereby said first and second body portions may be used as replacements for either body portion of the same or another swing check valve.

11. A swing check valve adapted to inhibit back flow of fluid from an outlet thereof to an inlet thereof, comprising a clapper member; and a housing having a first body portion, which includes a first valve seat and first mounting means for removably mounting said clapper member therefrom when said first body portion is positioned adjacent to the inlet, and a second body portion, which includes a second valve seat and second mounting means for removably mounting said clapper member therefrom when said second body portion is positioned adjacent to the inlet, said first and second body portions being removably connected to each other in an end-to-end fashion and being interchangeable with each other, whereby each body portion may be utilized as a replacement for the other body portion, said clapper member being mounted from one of said first and second mounting means and being pivotable between a first position, in which said clapper member is in engagement with a corresponding one of said first and second valve seats, and a second position, in which said clapper member abuts against the other one of said first and second mounting means, whereby said clapper member is inhibited from coming in contact with said housing.

12. The swing check valve of claim 11, further comprising biasing means for biasing said clapper member toward its said first position.

13. The swing check valve of claim 12, wherein said biasing means includes a counterweight connected to said clapper member for conjoint pivoting movement therewith.

14. The swing check valve of claim 11, wherein said first mounting means includes a first bearing, which is mounted on said first body portion adjacent to said first valve seat, and a first shaft extending through said first bearing; and wherein said second mounting means includes a second bearing, which is mounted on said second body portion adjacent to said second valve seat, and a second shaft extending through said second bearing.

15. The swing check valve of claim 14, wherein each of said first and second bearings is of a split bearing type.

16. The swing check vane of claim 14, wherein said clapper member includes an arm having receiving means, positioned at one end of said arm, for receiving one of said first and second shafts; a valve member; and attaching means for removably attaching said valve member to an opposite end of said arm.

17. The swing check valve of claim 16, wherein said attaching means includes an O-ring mounted on a stem of said valve member.

18. The swing check valve of claim 17, wherein said O-ring functions to align said valve member with a corresponding one of said first and second valve seats.

19. The swing check valve of claim 18, wherein said O-ring functions as a cushion as said clapper member assumes its said first position and its said second position.

20. The swing check valve of claim 19, wherein said opposite end of said arm includes an opening formed therein; and wherein said stem of said member extends through said opening in said opposite end of said arm, said stem having a groove sized and shaped so as to receive said O-ring.

21. The swing check valve of claim 11, wherein said first body portion and said second body portion are replaceable independently of each other, whereby said first and second body portions may be used as replacements for either body portion of the same or another swing check valve.

22. A method for repairing a swing check valve, comprising the steps of forming a valve housing from a pair of identical and interchangeable valve bodies, each being provided with its own valve seat; installing said valve housing in a piping system such that said valve bodies are arranged in an end-to-end fashion with one of said valve bodies being located adjacent to an inlet of said swing check valve and the other of said valve bodies being located adjacent to an outlet of said swing check valve; removably mounting a valve member from said one valve body such that said valve member is movable into and out of sealing engagement with said valve seat of said one valve body; interchanging said one valve body with said other valve body when said one valve body becomes worn or damaged; removing said valve member from said one valve body; and removably mounting said valve member or another valve member to said other valve body such that said valve member or said another valve member is movable into and out of sealing engagement with said valve seat of said other valve body.

23. The method of claim 22, further comprising the steps of injecting pressurized fluid into said valve housing through a first flush port and discharging said pressurized fluid from said valve housing through a second flush port, each of said first and second flush ports being provided in a corresponding one of said valve bodies, said injecting and discharging steps being carried out either before or after said interchanging step.

* * * * *